United States Patent
Kim

(10) Patent No.: US 7,935,439 B2
(45) Date of Patent: May 3, 2011

(54) POUCH TYPE LITHIUM SECONDARY BATTERY

(75) Inventor: Youngbok Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 918 days.

(21) Appl. No.: 11/409,032

(22) Filed: Apr. 24, 2006

(65) Prior Publication Data

US 2006/0269831 A1 Nov. 30, 2006

(30) Foreign Application Priority Data

Apr. 27, 2005 (KR) .................. 10-2005-0035300

(51) Int. Cl.
*H01M 10/04* (2006.01)
*H01M 10/50* (2006.01)
*H01M 2/26* (2006.01)
*H01M 6/46* (2006.01)

(52) U.S. Cl. .............. 429/161; 429/162; 429/62; 429/7; 429/211; 29/623.2

(58) Field of Classification Search .................. 429/62, 429/7, 162, 623, 181, 176, 177, 65, 232, 429/136, 96, 179, 161; 361/18, 56, 111, 361/119, 103, 106, 118, 124, 126, 127; 337/163, 337/164; 219/206, 225, 549, 553; 29/623.2
See application file for complete search history.

(56) References Cited

U.S. PATENT DOCUMENTS

| | | | | |
|---|---|---|---|---|
| 3,303,056 A | * | 2/1967 | Sabatino et al. | ............. 429/179 |
| 5,818,676 A | * | 10/1998 | Gronowicz, Jr. | ............. 361/106 |
| 2003/0108780 A1 | * | 6/2003 | Iwaizono et al. | ................. 429/7 |
| 2004/0185332 A1 | * | 9/2004 | Botos | .............................. 429/96 |
| 2004/0234848 A1 | * | 11/2004 | Chung et al. | .................. 429/181 |

FOREIGN PATENT DOCUMENTS

JP 2004-006115 1/2004

(Continued)

OTHER PUBLICATIONS

F. Bueche, "Electrical Properties of Carbon Black in an SBR—Wax Matrix", Journal of Polymer Science: Polymer Physiscs Edition, vol. 11, p. 1319-1330, (1973).*

(Continued)

*Primary Examiner* — Jonathan Crepeau
*Assistant Examiner* — Kenneth Douyette
(74) *Attorney, Agent, or Firm* — Christie, Parker & Hale, LLP

(57) ABSTRACT

A pouch type lithium secondary battery having a positive temperature coefficient element disposed to rapidly operate depending on an increase in the temperature of the battery, thereby improving the thermal stability of the battery. The pouch type lithium secondary battery includes: an electrode assembly including a first electrode plate to which a first electrode tab is attached, a second electrode plate to which a second electrode tab is attached, and a separator interposed between the first and second electrode plates; a pouch material having a space in which the electrode assembly is received; a protection circuit module having a junction pad, for controlling charging and discharging of the electrode assembly; and a positive temperature coefficient element which has one end attached to the junction pad, and the other end electrically connected to one of the first and second electrode tabs, so as to interrupt electric current when a temperature of the battery rises.

17 Claims, 3 Drawing Sheets

FOREIGN PATENT DOCUMENTS

| | | |
|---|---|---|
| JP | 2004-165457 | 6/2004 |
| KR | 10-2001-0011900 | 2/2001 |

OTHER PUBLICATIONS

Fournier et al., "Positive temperature coefficient effect in carbon black/epoxy polymer composites", Journal of Materials Science Letters, 16 (1997) p. 1677-1679.*

Ammi et al., "Stopping power of 1.0-2.6 MEV protons in Mylar, Makrofol and cellulose nitrate foils", Radiation Measurements, vol. 28, Issues 1-6, 1997, p. 15-18.*

English machine translation of Japanese Publication 2004-165457, Jun. 10, 2004.

English machine translation of Japanese Publication 2004-006115, Jan. 8, 2004.

* cited by examiner

POUCH TYPE LITHIUM SECONDARY BATTERY

CROSS-REFERENCE TO RELATED APPLICATIONS

This application claims the benefit of Korean Application No. 2005-35300, filed Apr. 27, 2005, in the Korean Intellectual Property Office, the entire content of which is incorporated herein by reference.

BACKGROUND OF THE INVENTION

1. Field of the Invention

Aspects of the present invention relate to a lithium secondary battery, and more particularly, to a pouch type lithium secondary battery which includes a positive temperature coefficient element arranged therein to rapidly operate according to a temperature increase of the battery, thereby having improved thermal stability.

2. Description of the Related Art

Recently, compact and lightweight electric/electronic devices such as cellular phones, laptop computers, camcorders and the like have been actively developed and produced. These portable electric/electronic devices respectively contain a battery pack in order to operate in a place where a separate electric source is not supplied. The contained battery pack is provided with at least one battery therein, so as to output a certain level of voltage to drive the portable electric/electronic device for a given duration.

In a consideration of economics, the battery pack has recently employed rechargeable secondary batteries. Representative secondary batteries include a nickel-cadmium battery, a nickel-hydrogen battery, a nickel-metal hydride battery, a lithium battery, a lithium ion battery, etc.

Specially, the lithium secondary batteries have rapidly developed because their energy density per unit weight is high, and their operation voltage is 3.6V, which is three times higher than that of the nickel-cadmium battery and the nickel-metal hydride battery that are widely used as an electric source for the portable electronic devices.

In such a lithium secondary battery, a positive electrode active material is mainly made of lithium-based oxide, while a negative electrode active material is made of carbon material. Generally, the lithium secondary battery can be classified into a liquid electrolyte battery and a polymer electrolyte battery according to the kind of electrolyte. Accordingly, the battery using the liquid electrolyte is referred to as a lithium ion battery, while the battery using the polymer electrolyte is referred to as a lithium polymer battery. Further, the lithium secondary battery is manufactured into various types, for example, cylindrical type, polygonal type and pouch type.

Typically, the pouch type lithium secondary battery among the lithium secondary batteries has a pouch of multi-layers including a metal foil layer and a synthetic resin layer covering the metal foil layer. Thus, the pouch type lithium secondary battery employing such a pouch has a remarkably reduced weight in comparison with a cylindrical or polygonal lithium secondary battery using a metal can instead of the pouch. Thus, research for making lighter lithium secondary batteries has focused on the development of the pouch type lithium secondary battery.

In such a pouch type lithium secondary battery, an electrode assembly, in which positive and negative electrode plates and a separator interposed between the positive and negative electrode plates are wound in several times, is received in the pouch, while positive and negative electrode tabs are extended out of a side of the pouch to connect to a protection circuit module.

The protection circuit module has various protection circuits arranged on a printed circuit board. Further, the protection circuit module has a structure in which a positive temperature coefficient element is mounted thereon.

However, since the positive temperature coefficient element is mounted on the protection circuit module, the reaction velocity of the positive temperature coefficient element is slow when the temperature in the pouch type lithium secondary battery rapidly rises due to overcharging or rapid discharging of the battery.

If the reaction velocity of the positive temperature coefficient element is slow, as described above, there exists a danger of an explosion of the pouch type lithium secondary battery.

SUMMARY OF THE INVENTION

Accordingly, aspects of the present invention have been made to solve the above-mentioned and/or other problems occurring in the related art, and an object of the present invention is to provide a pouch type lithium secondary battery which includes a positive temperature coefficient element arranged to rapidly operate according to a temperature increase of the battery, thereby having improved thermal stability.

In order to accomplish the above and/or other aspects of the present invention, a pouch type lithium secondary battery is provided which comprises: an electrode assembly including a first electrode plate to which a first electrode tab is attached, a second electrode plate to which a second electrode tab is attached, and a separator interposed between the first electrode plate and the second electrode plate; a pouch having a space in which the electrode assembly is received; a protection circuit module having a junction pad, to control charging and discharging of the electrode assembly; and a positive temperature coefficient element which has one end attached to the junction pad, and the other end electrically connected to one of the first electrode tab and the second electrode tab, so as to interrupt electric current when a temperature of the battery rises.

According to an aspect of the present invention, any one of upper and lower conductive layers is connected to any one of first and second connection leads, while the other one of the upper and lower conductive layers is electrically connected to the junction pad.

According to an aspect of the present invention, the positive temperature coefficient element includes the upper conductive layer, the lower conductive layer, and the positive temperature coefficient material layer interposed between the upper and lower conductive layers.

According to an aspect of the present invention, the upper and lower conductive layers are made of a conductive metal.

One of the upper and lower conductive layers is connected to one of first and second connection leads which is electrically connected to one of first and second electrode tabs, for example, the second electrode tab.

According to an embodiment of the present invention, the positive temperature coefficient material layer is made of styrene butadiene rubber to which carbon is added.

According to an embodiment of the present invention, the junction pad is made of nickel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
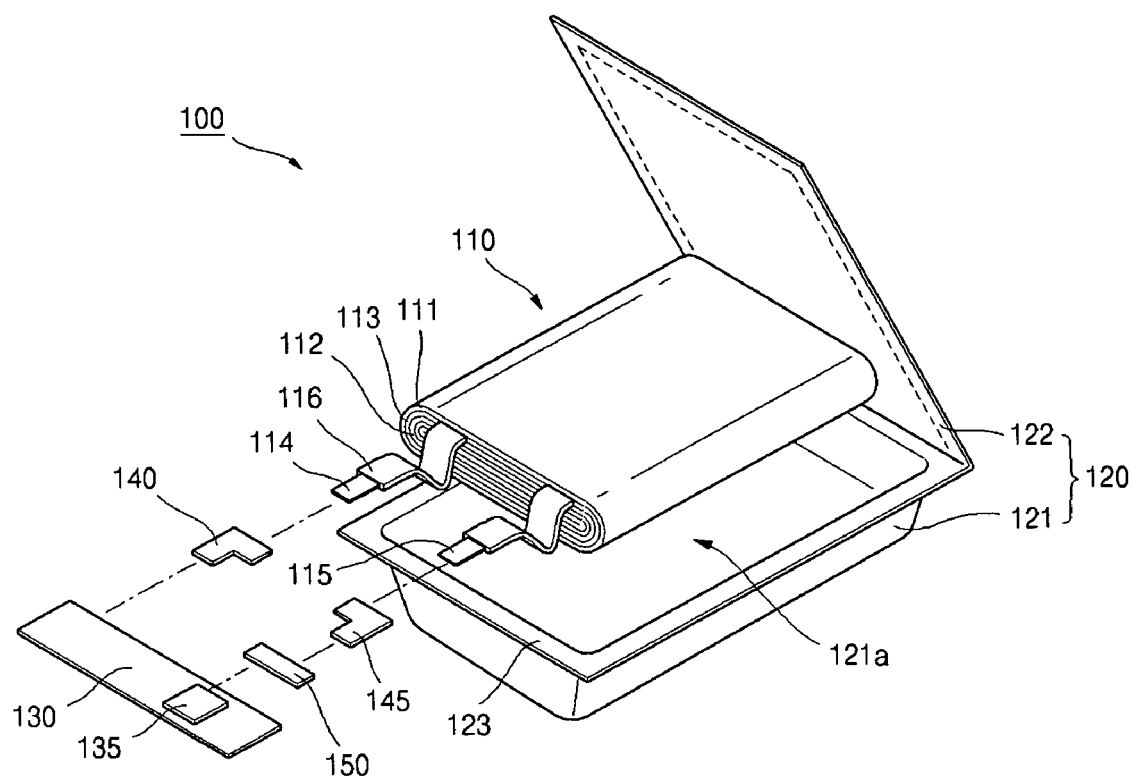
FIG. 1A is a perspective view showing a pouch type lithium secondary battery according to an embodiment of the present invention, before the lithium secondary battery is sealed within a pouch.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
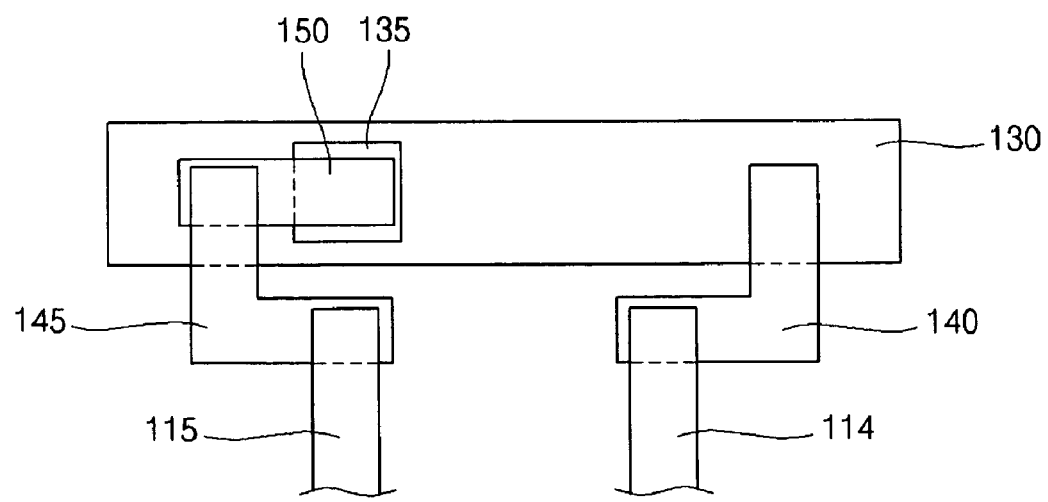
FIG. 1B is a plan view illustrating the connections among an electrode protection assembly, a circuit module and a connection lead in the pouch type lithium secondary battery according to the embodiment of the present invention.
Figure 1C:
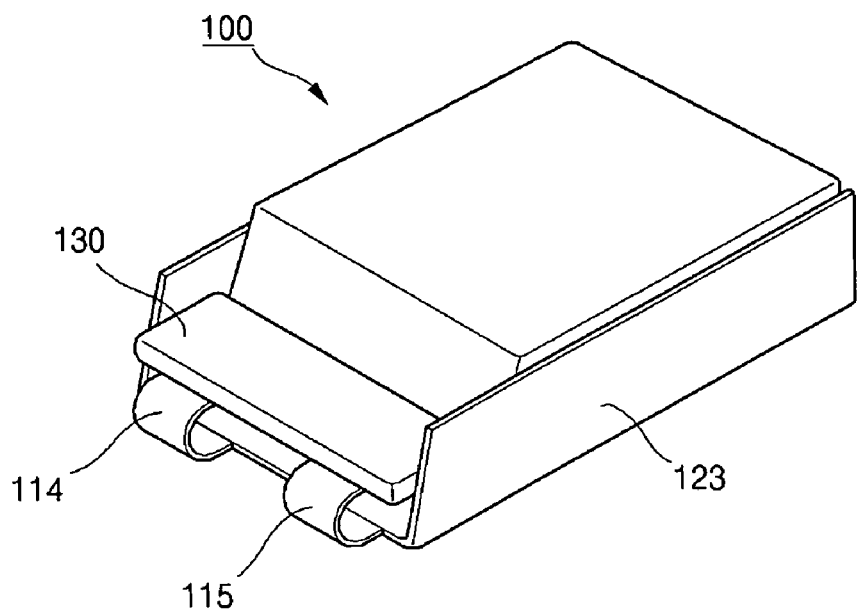
FIG. 1C is a perspective view showing the pouch type lithium secondary battery according to the embodiment of the present invention, after the lithium secondary battery is sealed within the pouch.

FIG. 1A is a perspective view showing a pouch type lithium secondary battery according to an embodiment of the present invention, before the lithium secondary battery is sealed within a pouch, FIG. 1B is a plan view illustrating the connections among an electrode protection assembly, a circuit module and a connection lead in the pouch type lithium secondary battery according to the embodiment of the present invention, and FIG. 1C is a perspective view showing the pouch type lithium secondary battery according to the embodiment of the present invention, after the lithium secondary battery is sealed within the pouch.

Referring to FIGS. 1A to 1C, the pouch type lithium secondary battery 100 according to the embodiment of the present invention includes an electrode assembly 110, a pouch 120 for receiving the electrode assembly 110, a protection circuit module 130 for controlling charging and discharging of the electrode assembly 110, connection leads 140 and 145 for electrically connecting the electrode assembly 110 and the protection circuit module 130, and a positive temperature coefficient (PTC) element 150 for interrupting an electric current in the battery when the pouch type lithium secondary battery 100 abnormally generates heat.

The electrode assembly 110 includes a first electrode plate 111 coated with one of a positive electrode active material and a negative electrode active material, for example the positive electrode active material, a second electrode plate 112 coated with the other of the positive electrode active material and the negative electrode active material, for example the negative electrode active material, and a separator 113 disposed between the first electrode plate 111 and the second electrode plate 112 so as to prevent electric short-circuiting between the first electrode plate 111 and the second electrode plate 112 as well as to allow only the movement of lithium ions. Further, the first electrode plate 111 is generally made from aluminum material, to which a first electrode tab 114 is attached and functions as a positive electrode tab extending at a predetermined distance. The second electrode plate 112 is generally made of nickel material, to which a second electrode tab 115 is attached and functions as a negative electrode tab extending at a predetermined distance. However, the present invention does not limit the materials for the electrode tabs to those as described above. On the other hand, the first and second electrode plates 111 and 112 may further include two pieces of insulation tape 116 respectively, in order to prevent electric short-circuiting among the first electrode tab 114, the second electrode tab 115 and the pouch material 120.

Chalcogenide compounds, for example composite metal oxides such as $LiCoO_2$, $LiMn_2O_4$, $LiNiO_2$, $LiNi_{(1-x)}Co_xO_2$ ($0<x<1$), and $LiMnO_2$, are used as the positive electrode active material. Carbon-based materials, Si, Sn, Tin oxide, composite tin alloys, transition metal oxide, lithium metal nitride, and lithium metal oxide, etc. are used as the negative electrode active material. Generally, the positive electrode plate is made of aluminum material, while the negative electrode plate is made of copper material. The separator is typically made from polyethylene resin or polypropylene resin. However, the present invention does not limit the materials of the positive and negative electrodes and the separator to those mentioned above.

The first and second electrode tabs 114 and 115 of the electrode assembly 110 extend through a certain one side of a junction portion 123 of the pouch 120. The first and second electrode tabs 114 and 115 are electrically connected to the protection circuit module 130 by means of the first and second connection leads 140 and 145.

The pouch 120 includes a lower part 121 with a space 121a for receiving the electrode assembly 110 and an upper part 122 for covering the lower part 121 in which the space 121a is formed. An edge portion of the space 121a of the lower part 121 is the junction portion 123 to which the upper part 122 of the pouch 120 is attached so as to seal the lower part 121 of the pouch 120 after the electrode assembly 110 is received in the pouch 120. Meanwhile, the space 121a for receiving the electrode assembly 110 is formed through a pressing working or the like. In addition, the pouch 120 is sealed in such a manner that the upper part 122 of the pouch 120 covers and is attached to the lower part 121 after the electrode assembly 110 is received in the space 121a of the lower part 121 of the pouch 120.

The pouch 120 includes a core portion made of metal such as aluminum material, a thermal fusion-bonding layer formed on an upper surface of the core portion, and an insulation layer formed on a lower surface of the core. The thermal fusion-bonding layer includes a denaturalized polypropylene layer, for example a Cast Polypropylene (CPP) layer, which is a polymer resin layer. The polypropylene layer is used as an adhesive layer. The insulation layer is made of resin such as nylon resin or polyethyleneterephtalate (PET) resin. However, the present invention does not limit the structure and the materials of the pouch 120 to those mentioned above.

The protection circuit module 130 is to control the charging, discharging and malfunction of the electrode assembly 110. For example, the protection circuit module 130 plays the role of interrupting excessive electric current when the excessive electric current flows from the electrode assembly 110.

Furthermore, the protection circuit module 130 includes a junction pad 135 made of a conductive metal material such as nickel, etc., to which the positive temperature coefficient element 150 is attached. The positive temperature coefficient element 150 is connected to one of the first and second connection leads 140 and 145, for example, the second lead 145 electrically connected to a second electrode tab 115 which functions as the negative electrode tab.

The junction pad 135 is to facilitate the junction between the positive temperature coefficient element 150 and the protection circuit module 130. Further, the protection circuit module 130 generally includes various protection circuits, although not shown in the drawings.

The first and second connection leads 140 and 145 electrically connect the first and second electrode tabs 114 and 115 of the electrode assembly 110 to the protection circuit module 130 and the positive temperature coefficient element 150.

Here, one of the first and second connection leads 140 and 145, for example, the first connection lead 140, has one end attached to a terminal end of the first electrode tab 114 functioning as the positive electrode tab in a manner of welding, etc., and the other end electrically connected to the protection circuit module 130.

In addition, the other one of the first and second connection leads 140 and 145, for example, the second connection lead 145, has one end attached to a terminal end of the second electrode tab 115 functioning as the negative electrode tab in a manner of welding, etc., and the other end electrically connected to the positive temperature coefficient element 150.

Further, the first connection lead 140 and the second connection lead 145 substantially have a letter L shape. However, the present invention does not limit the shape of the first and second connection leads 140 and 145 to that mentioned above.

The positive temperature coefficient element 150 electrically connects one of the first and second connection leads 140 and 145, for example, the second connection lead 145 electrically connected to the second electrode tab 115, to the junction pad 135 of the protection circuit module 130.

Such a positive temperature coefficient element 150 has an infinitely increasing resistance so as to interrupt the electric current when the temperature in the pouch type lithium secondary battery 100 increases so as to be higher than a predetermined value, while becoming conductive to allow the electric current to flow when the temperature is lowered below the predetermined value.

Meanwhile, after the protection circuit module 130 is electrically connected to the electrode tabs 114 and 115 by the connection leads 140 and 145 and the positive temperature coefficient element 150, as shown in FIG. 1B, the first and second electrode tabs 114 and 115 and the first and second connection leads 140 and 145 are folded so that the protection circuit module 130 is located at a position, where the first and second electrode tabs 114 and 115 are drawn out, on the junction 123 of the pouch 120, as shown in FIG. 1C.

Figure 2A:
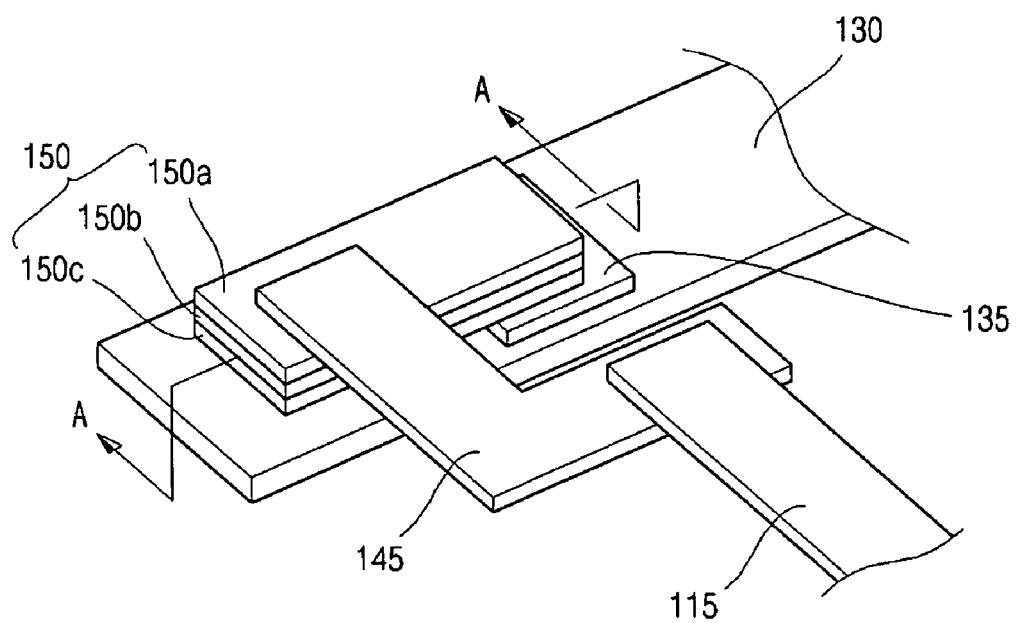
FIG. 2A is a view showing a positive temperature coefficient element according to the embodiment of the present invention.
Figure 2B:
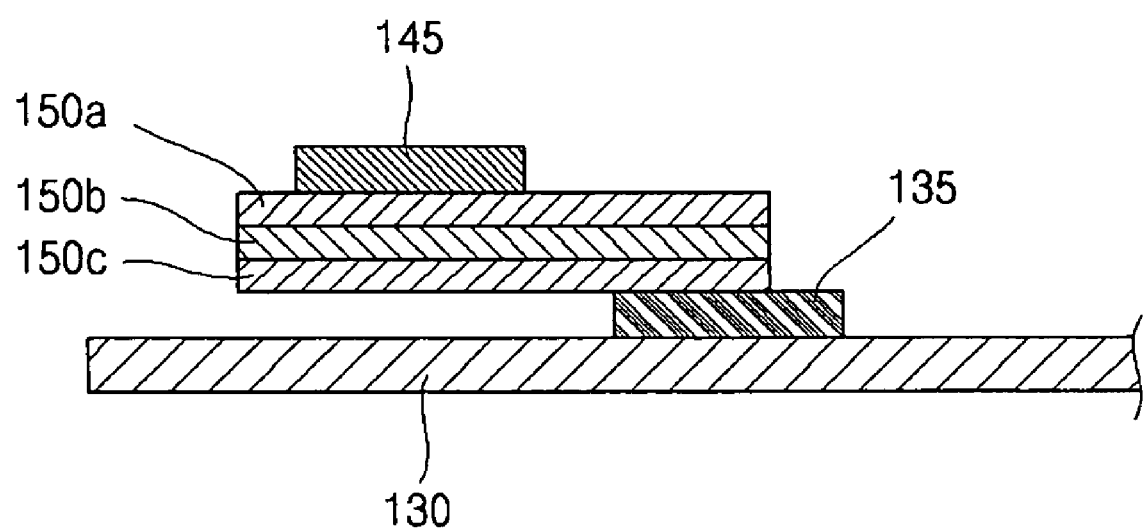
FIG. 2B is a sectional view showing the positive temperature coefficient element according to the embodiment of the present invention, taken along a line A-A in FIG. 2A.

FIG. 2A is a view showing the positive temperature coefficient element 150 according to the embodiment of the present invention, and FIG. 2B is a sectional view showing the positive temperature coefficient element 150 according to the embodiment of the present invention, taken along a line A-A in FIG. 2A, which shows the connection of the protection circuit module 130, the positive temperature coefficient element 150, and the connection lead 145.

Referring to FIGS. 2A and 2B, one end of the positive temperature coefficient element 150 of the pouch type lithium secondary battery 100 according to the embodiment of the present invention is attached to the junction pad 135 of the protection circuit module 130 in a manner such as resistance welding or ultrasonic welding, while the other end of the positive temperature coefficient element 150 is electrically connected to one of the first and second connection leads 140 and 145, for example, the second connection lead 145. At this time, the second connection lead 145 is electrically connected to the second electrode tab 115 which functions as the negative electrode tab.

The positive temperature coefficient element 150 includes an upper conductive layer 150a, a lower conductive layer 150c, and a positive temperature coefficient material layer 150b interposed between the upper and lower conductive layers 150a and 150c.

The upper conductive layer 150a and the lower conductive layer 150c are generally made of a conductive metal, for example nickel and the like. However, the present invention does not limit the material of the conductive layers to that mentioned above.

One of the upper and lower conductive layers 150a and 150c, for example, the upper conductive layer 150a, is electrically connected to one of the second connection lead 145 and the junction pad 135 of the pouch type lithium secondary battery, for example, the second connection lead 145.

Further, one of the upper conductive layer 150a and the lower conductive layer 150c, for example, the lower conductive layer 150c, is electrically connected to one of the second connection lead 145 and the junction pad 135, for example, the junction pad 135.

The positive temperature coefficient material layer 150b may be made of polymer composite, for example, the composite where carbon is added to styrene butadiene rubber. Such a positive temperature coefficient material layer 150b has a property in which its resistance infinitely increases so as to interrupt the electric current if the temperature in the battery rises higher than a predetermined value.

Further, the positive temperature coefficient material layer 150b preferably has a thickness less than 0.3 mm. This is because, in the case where the positive temperature coefficient material layer 150b has a thickness more than 0.3 mm, the protection circuit module 130 is located at such a high position when it is disposed above the protruding first and second electrode tabs 114 and 115, as to make it difficult to contain and couple the pouch type lithium secondary battery in a hard case during a process of fabricating a hard pack battery.

In the pouch type lithium secondary battery according to the embodiment of the present invention as described above, the positive temperature coefficient element 150 is connected to the junction pad 135 of the protection circuit module 130 and the second connection lead 145, thereby advantageously operating with respect to the increasing of the temperature in the pouch type lithium secondary battery 100 in comparison with the conventional positive temperature coefficient element directly mounted on the protection circuit module.

Therefore, as the positive temperature coefficient element rapidly operates according to the increasing of the temperature in the pouch type lithium secondary battery, the possibility of the explosion of the pouch type lithium secondary battery can be reduced.

Accordingly, the thermal stability of the pouch type lithium secondary battery can be improved.

According to the present invention, the positive temperature coefficient element is disposed to rapidly operate depending on the increasing of the temperature in the battery, thereby improving the thermal stability of the pouch type lithium secondary battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A pouch type lithium secondary battery comprising:
   an electrode assembly including a first electrode plate to which a first electrode tab is attached, a second electrode plate to which a second electrode tab is attached, and a separator located between the first electrode plate and the second electrode plate;
   a pouch housing the electrode assembly;
   a protection circuit module to control charging and discharging of the electrode assembly;
   a junction pad mounted on the protection circuit module;
   a positive temperature coefficient element which has one end attached to the junction pad, and the other end electrically connected to one of the first electrode tab and the second electrode tab, and configured to interrupt electric current when a temperature of the battery reaches a threshold temperature; and
   first and second connection leads extending from the protection circuit module to an exterior of the pouch, wherein:
      the first and second connection leads electrically connect any one of the protection circuit module and the positive temperature coefficient element to any one of the first and second electrode tabs, respectively, and
      the first and second connection leads are L-shaped and substantially planar having a first planar surface and a second planar surface opposite to the first planar surface, wherein the first planar surface contacts the protection circuit module or the positive temperature coefficient element and the second planar surface contacts the first or second electrode tab.

2. The pouch type lithium secondary battery as claimed in claim 1, wherein the positive temperature coefficient element includes a first conductive layer, a second conductive layer, and a positive temperature coefficient material layer located between the first and second conductive layers.

3. The pouch type lithium secondary battery as claimed in claim 2, wherein the first and second conductive layers comprise a conductive metal.

4. The pouch type lithium secondary battery as claimed in claim 2, wherein any one of the first and second conductive layers is connected to any one of the first and second connection leads, while the other one of the first and second conductive layers is electrically connected to the junction pad.

5. The pouch type lithium secondary battery as claimed in claim 4, wherein one end of the positive temperature coefficient element is connected to the junction pad by one of a resistance weld and an ultrasonic weld.

6. The pouch type lithium secondary battery as claimed in claim 2, wherein the positive temperature coefficient material layer comprises a polymer composite.

7. The pouch type lithium secondary battery as claimed in claim 2, wherein the positive temperature coefficient material layer has an infinitely increasing resistance to interrupt the electric current when the temperature in the pouch type lithium secondary battery increases above the threshold temperature, while becoming conductive to allow the electric current to flow when the temperature is below the threshold temperature.

8. The pouch type lithium secondary battery as claimed in claim 2, wherein the positive temperature coefficient material layer comprises styrene butadiene rubber to which carbon is added.

9. The pouch type lithium secondary battery as claimed in claim 1, wherein the junction pad comprises nickel.

10. The pouch type lithium secondary battery as claimed in claim 1, further comprising a hard case to contain and protect the pouch type lithium secondary battery while exposing connection leads on the protection circuit module for charging and discharging of the electrode assembly.

11. The pouch type lithium secondary battery as claimed in claim 1, wherein the pouch includes a core portion, a thermal fusion-bonding layer formed on a first surface of the core portion, and an insulation layer formed on a second surface of the core portion.

12. The pouch type lithium secondary battery as claimed in claim 1, wherein the first electrode plate is coated with one of a positive electrode material and a negative electrode active material and the second electrode plate is coated with the other of the positive electrode material and the negative electrode material.

13. The pouch type lithium secondary battery as claimed in claim 2, wherein the positive temperature coefficient material layer is less than 0.3 mm thick.

14. The pouch type lithium secondary battery as claimed in claim 1, wherein an insulation tape is wrapped around each of the first electrode tab and the second electrode tab to prevent electric short-circuiting among the first electrode tab, the second electrode tab and the pouch.

15. A method of producing a pouch type lithium secondary battery comprising:
   sealing an electrode assembly in a pouch, the electrode assembly, having opposing electrode tabs extending therefrom;
   connecting one of the electrode tabs to a positive temperature coefficient element;
   connecting the positive temperature coefficient element to a junction pad on a protection circuit module;
   connecting the other electrode tab to the protection circuit module so as to allow interruption of electric current flow when a temperature of the battery increases above a threshold temperature; and
   exposing first and second connection leads on the protection circuit module for charging and discharging of the electrode assembly,
   wherein: the first and second connection leads extend from the protection circuit module to an exterior of the pouch,
      the first and second connection leads are located to electrically connect any one of the protection circuit module and the positive temperature coefficient element to any one of the first and second electrode tabs, respectively, and
      the first and second connection leads are L-shaped and substantially planar having a first planar surface and a second planar surface opposite to the first planar surface, wherein the first planar surface contacts the protection circuit module or the positive temperature coefficient element and the second planar surface contacts the first or second electrode tab.

16. The method of producing a pouch type lithium secondary battery as claimed in claim 15, further comprising: inserting the pouch, the electrode tabs, the positive temperature coefficient element, the junction pad, and the protection circuit module into a hard case.

17. The method of producing a pouch type lithium secondary battery as claimed in claim 15, wherein sealing the electrode assembly includes:

coating a first electrode plate with one of a positive electrode active material and a negative electrode active material;

coating a second electrode plate with the other of the positive electrode active material and the negative electrode active material;

placing a separator between the first electrode plate and the second electrode plate; and extending one of the electrode tabs from each of the first electrode and the second electrode plate.

* * * * *